US008231255B2

(12) United States Patent
Konishi

(10) Patent No.: US 8,231,255 B2
(45) Date of Patent: Jul. 31, 2012

(54) VEHICLE LIGHT

(75) Inventor: Sadayuki Konishi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 56 days.

(21) Appl. No.: 12/954,600

(22) Filed: Nov. 24, 2010

(65) Prior Publication Data

US 2011/0122638 A1 May 26, 2011

(30) Foreign Application Priority Data

Nov. 24, 2009 (JP) ................................. 2009-266487

(51) Int. Cl.
*B60Q 1/04* (2006.01)

(52) U.S. Cl. ........ 362/538; 362/507; 362/509; 362/520; 362/545

(58) Field of Classification Search .................. 362/507, 362/509, 538, 520, 543–545
See application file for complete search history.

(56) References Cited

U.S. PATENT DOCUMENTS

| | | | | |
|---|---|---|---|---|
| 4,851,968 | A * | 7/1989 | Nino | 362/539 |
| 6,742,918 | B2 * | 6/2004 | Collins | 362/509 |
| 6,821,008 | B2 * | 11/2004 | Tokoro et al. | 362/539 |
| 7,261,448 | B2 * | 8/2007 | Ishida et al. | 362/507 |
| 7,625,109 | B2 * | 12/2009 | Tsukamoto | 362/538 |
| 7,862,217 | B2 * | 1/2011 | Suzuki et al. | 362/545 |
| 7,950,837 | B2 * | 5/2011 | Yatsuda et al. | 362/545 |
| 8,075,166 | B2 * | 12/2011 | Ohno et al. | 362/310 |
| 8,093,613 | B2 * | 1/2012 | Yatsuda et al. | 257/98 |
| 2007/0041207 | A1 | 2/2007 | Ishida | |

FOREIGN PATENT DOCUMENTS

| | | |
|---|---|---|
| JP | 2007-52955 A | 3/2007 |

* cited by examiner

*Primary Examiner* — Ali Alavi
(74) *Attorney, Agent, or Firm* — Kenealy Vaidya LLP

(57) ABSTRACT

A vehicle light can electrically change over between a horizontally wide light distribution pattern and an AFS suitable light distribution pattern for projecting light beams leftward (or rightward according to the traffic system). The vehicle light can include a projection lens having a light incident surface and a light exiting surface; and a horizontally long rectangular surface light source including a plurality of semiconductor light emitting devices that are horizontally disposed on both sides with respect to a focus of the projection lens and are independently controlled to be turned on/off. The projection lens can vertically converge and horizontally diffuse light beams for projection. Respective optical axes of the projection lens and the rectangular surface light source are inclined by an angle θ toward an outer side with respect to a front-to-rear direction of a vehicle body where the vehicle light is to be mounted, whereby a light distribution pattern horizontally uniform can be formed by light beams emitted from the semiconductor light emitting devices disposed on the outer side with respect to the focus of the projection lens.

18 Claims, 15 Drawing Sheets

VEHICLE LIGHT

This application claims the priority benefit under 35 U.S.C. §119 of Japanese Patent Application No. 2009-266487 filed on Nov. 24, 2009, which is hereby incorporated in its entirety by reference.

TECHNICAL FIELD

The presently disclosed subject matter relates to a vehicle light, and in particular, to a vehicle light that can electrically change between a horizontally wide light distribution pattern and a light distribution pattern suitable for an AFS (Adaptive Front-Lighting System) for projecting light beams leftward (or rightward according to the traffic system).

BACKGROUND ART

Known conventional vehicle lights can form a synthesized light distribution pattern utilizing a plurality of LED light sources, for example, as disclosed in Japanese Patent Application Laid-Open No. 2007-52955 (or U.S. Patent Application Laid-Open No. 2007/0041207A1 corresponding thereto). Specifically, as shown in FIGS. 1 and 2, a conventional vehicle light 300 (FIG. 2) can include a light source module 310 including first to sixth LED light sources 311 to 316 (FIG. 1). The LED light sources 311 to 316 can be radially arranged and independently controlled to be turned on/off. When all the first to sixth LED light sources 311 to 316 are turned on, the respective first to sixth partial light distribution patterns P11 to P16 can be formed corresponding to the first to sixth LED light sources 311 to 316 as shown in FIG. 2, thereby forming a synthesized light distribution pattern as a whole.

The vehicle light 300 configured as described above can be controlled to independently turn on/off the LED light sources 311 to 316 so as to electrically change over, for example, between a first partial light distribution pattern P11 formed by the first LED light source 311 and a light distribution pattern suitable for an AFS for projecting light beams leftward (or rightward according to the traffic system). Hereinafter, the light distribution pattern suitable for an AFS may be referred to as an AFS light distribution pattern, and can be formed by the second and third partial light distribution patterns P12 and P13 formed by the respective second and third LED light sources 312 and 313 and disposed on the right side and left side in the illuminated area.

In the vehicle light 300 configured as described above, the first LED light source 311 can be disposed between the second LED light source 312 and the third LED light source 313 as shown in FIG. 1. According to this physical relationship, the first partial light distribution pattern P11 corresponding to the first LED light source 311 can have a limited illuminated area delimited by the second and third partial light distribution patterns P12 and P13 on both sides thereof, thereby forming only a horizontally narrow light distribution pattern, as shown in FIG. 2. Accordingly, the vehicle light 300 configured as described above, can change over only between the horizontally narrow light distribution pattern P11 and the AFS light distribution pattern synthesized by the second and third partial light distribution patterns P12 and P13 disposed on both the right and left sides, but cannot utilize a horizontally wide light distribution pattern and an AFS light distribution pattern for projecting light beams leftward (or rightward according to the traffic system).

SUMMARY

The presently disclosed subject matter was devised in view of these and other problems and features of the conventional art. According to an aspect of the presently disclosed subject matter, a vehicle light can electrically change over between a horizontally wide light distribution pattern and an AFS light distribution pattern for projecting light beams leftward (or rightward according to the traffic system).

According to another aspect of the presently disclosed subject matter, a vehicle light can include: a projection lens having a light incident surface and a light exiting surface as well as a focus and an optical axis; and a horizontally long rectangular surface light source having an optical axis and including a plurality of semiconductor light emitting devices that can be horizontally disposed on both sides with respect to the focus of the projection lens and can be independently controlled to be turned on/off. In this configuration, the projection lens can be configured to vertically converge and horizontally diffuse light beams that are incident on the light incident surface and exit through the light exiting surface. Furthermore, the projection lens and the rectangular surface light source can be disposed so that the respective optical axes thereof are inclined by an angle θ toward a first side with respect to an axis extending in a front-to-rear direction of a vehicle body where the vehicle light is to be mounted, thereby forming a light distribution pattern horizontally uniform with respect to a vertical axis in front of the vehicle body by light beams emitted from the semiconductor light emitting devices disposed on the first side with respect to the focus of the projection lens and passing through the projection lens. In this configuration, the first side can be an outer side with respect to the vehicle as compared to the focus of the projection lens when the vehicle light is installed in the vehicle body.

In the vehicle light configured as described above, the respective optical axes of the projection lens and the light source can be inclined by an angle θ toward the first side, or the outer side, with respect to the axis extending in a front-to-rear direction of a vehicle body. When the semiconductor light emitting devices disposed on the first side, or the outer side, with respect to the focus of the projection lens out of the plurality of semiconductor light emitting devices are turned on, the light beams therefrom can form a light distribution pattern horizontally uniform and wide with respect to the vertical axis in front of the vehicle body. On the other hand, when the semiconductor light emitting devices disposed on a second side, or an inner side, with respect to the focus of the projection lens out of the plurality of semiconductor light emitting devices are turned on, a light distribution pattern suitable for an AFS can be formed on a left side or right side of the horizontally wide light distribution pattern according to a traffic system (right-hand traffic or left-hand traffic). Namely, the vehicle light can electrically change over between the horizontally wide light distribution pattern and the AFS light distribution pattern for projecting light beams leftward (or rightward according to the traffic system).

In the vehicle light configured as described above, the projection lens can have a reflecting surface configured to reflect light beams entering through the light incident surface so that the light beams are allowed to exit through the light exiting surface after being reflected by the reflecting surface. In this case, the front-to-rear direction can be considered as being bent by the reflecting surface.

Accordingly, when the semiconductor light emitting devices disposed on the first side, or the outer side, with respect to the focus of the projection lens out of the plurality of semiconductor light emitting devices are turned on, the light beams therefrom can form a light distribution pattern horizontally uniform and wide with respect to the vertical axis in front of the vehicle body. On the other hand, when the semiconductor light emitting devices disposed on the second side, or the inner side, with respect to the focus of the projection lens out of the plurality of semiconductor light emitting devices are turned on, a light distribution pattern suitable for an AFS can be formed on a left side or right side of the horizontally wide light distribution pattern according to a traffic system (right-hand traffic or left-hand traffic). Namely, the vehicle light can electrically change over between the horizontally wide light distribution pattern and the AFS light distribution pattern for projecting light beams leftward (or rightward according to the traffic system).

BRIEF DESCRIPTION OF DRAWINGS

These and other characteristics, features, and advantages of the presently disclosed subject matter will become clear from the following description with reference to the accompanying drawings, wherein:

FIG. 6C is a lighting pattern during the AFS being turned on;

FIG. 9 is a schematic diagram illustrating the case where the projection lens and the rectangular surface light source which are inclined by the angle θ form a light distribution pattern P2 where the AFS is turned on;

FIG. 10B is a diagram illustrating the light distribution pattern P2 formed in the case where the projection lens and the rectangular surface light source are inclined by the angle θ and the AFS is turned on;

FIG. 11B is a diagram illustrating a light distribution pattern formed in the case of the same comparative vehicle light (Comparative Example 1) where the AFS is turned on;

FIG. 12B is a diagram illustrating a light distribution pattern formed in the case of the same comparative vehicle light (Comparative Example 2) where the AFS is turned on;

FIG. 14B is a diagram illustrating a light distribution pattern P4 formed in the case where the light-guiding lens as a projection lens and the rectangular surface light source are inclined by the angle θ and the AFS is turned on.

DESCRIPTION OF EXEMPLARY EMBODIMENTS

A description will now be made below to vehicle lights of the presently disclosed subject matter with reference to the accompanying drawings in accordance with exemplary embodiments.

It should be noted that in the present specification, the directions with regard to the “up,” “down,” “right,” “left,” “front,” and “rear” and the like may refer to the case where the vehicle light is installed in a vehicle body. Namely, the directions may be considered to match to the vertical direction (up-to-down direction), the lateral direction (right-to-left or vehicle width direction), and the front-to-rear direction of the vehicle body.

Furthermore, the following illustrated examples are described on the basis of the left-hand traffic system, but the presently disclosed subject matter can be applied to the right-hand traffic system by horizontally reversing the vehicle lights made in accordance with the principles of the presently disclosed subject matter.

Figure 1:
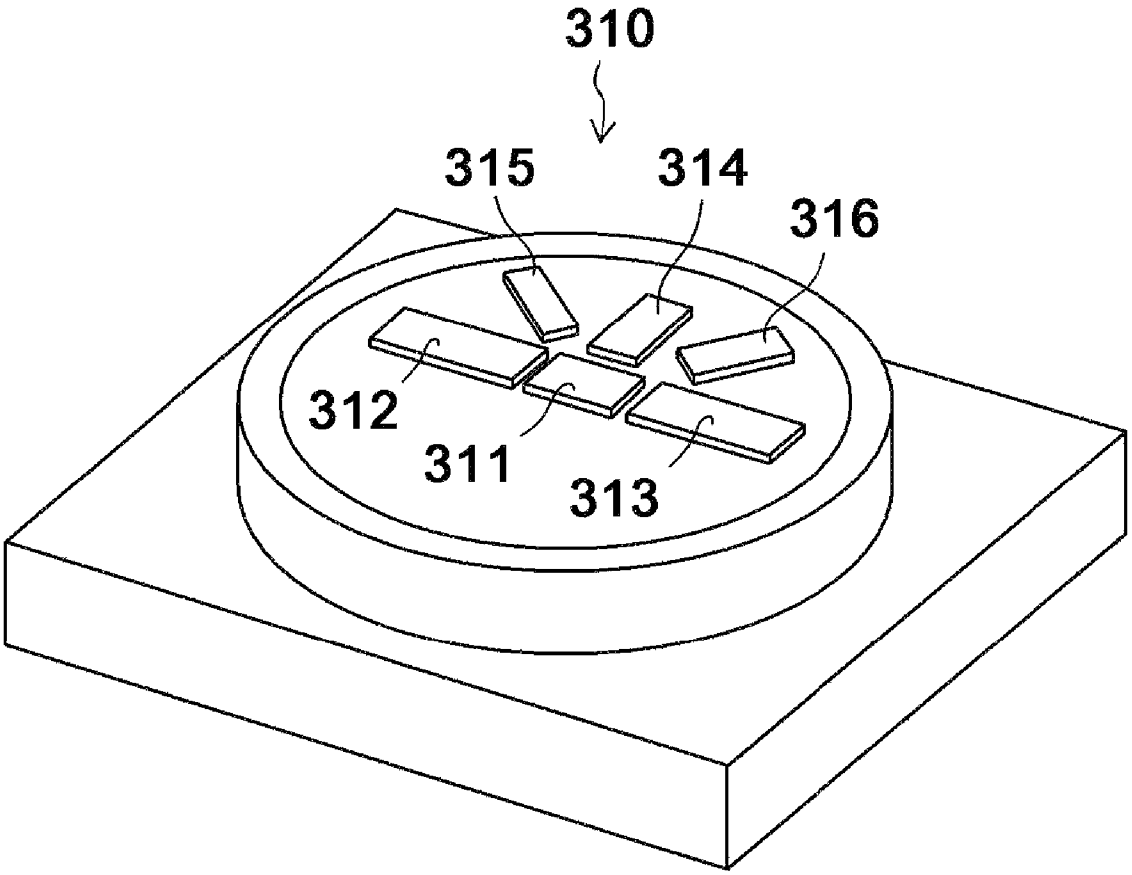
Fig. 1 Conventional Art
FIG. 1 is a perspective view of an exemplary light source unit for use in a conventional vehicle light.
Figure 2:
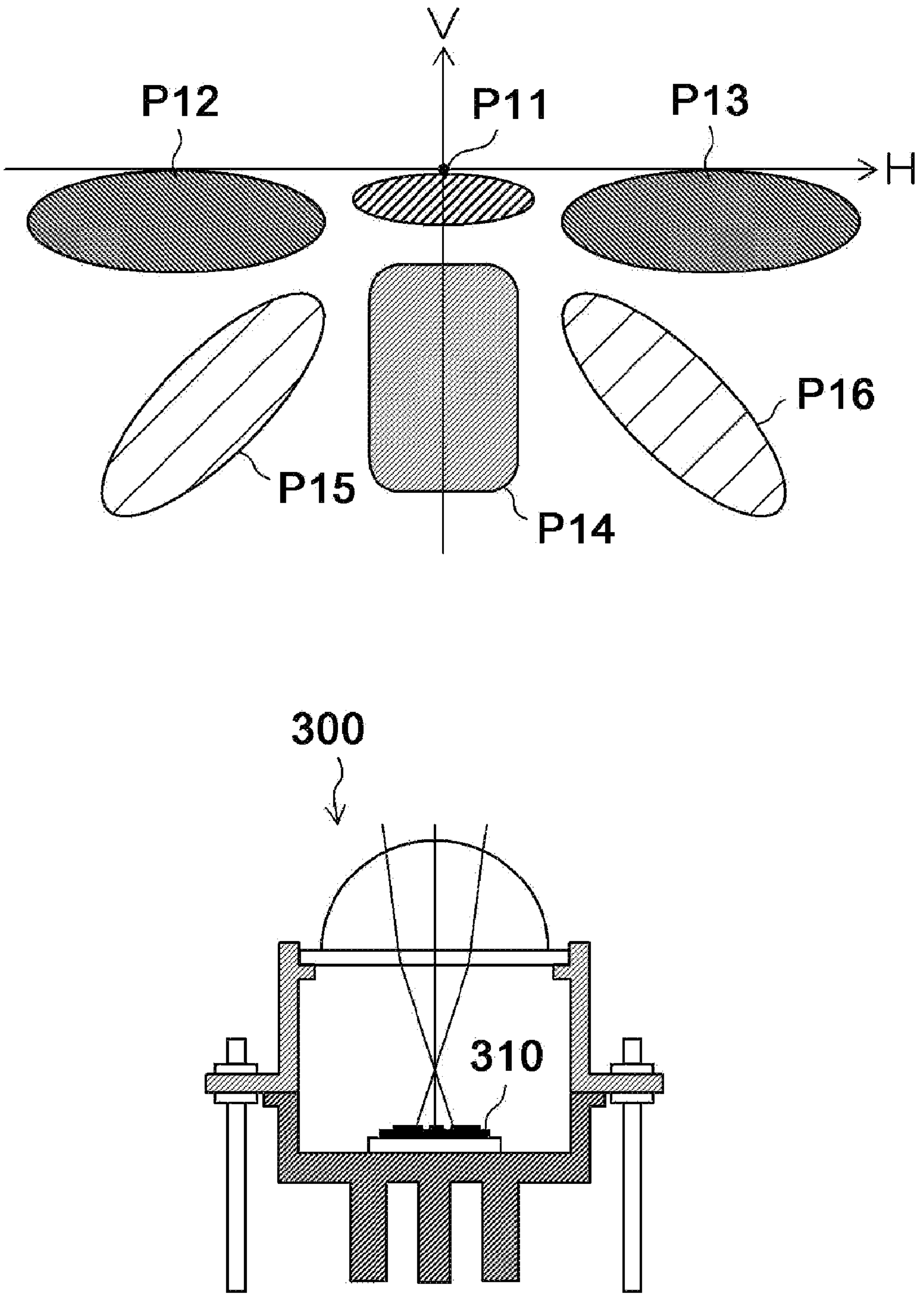
Fig. 2 Conventional Art
FIG. 2 is a schematic view illustrating the conventional vehicle light and a light distribution pattern including partial light distribution patterns formed by the conventional vehicle light.
Figure 3A:
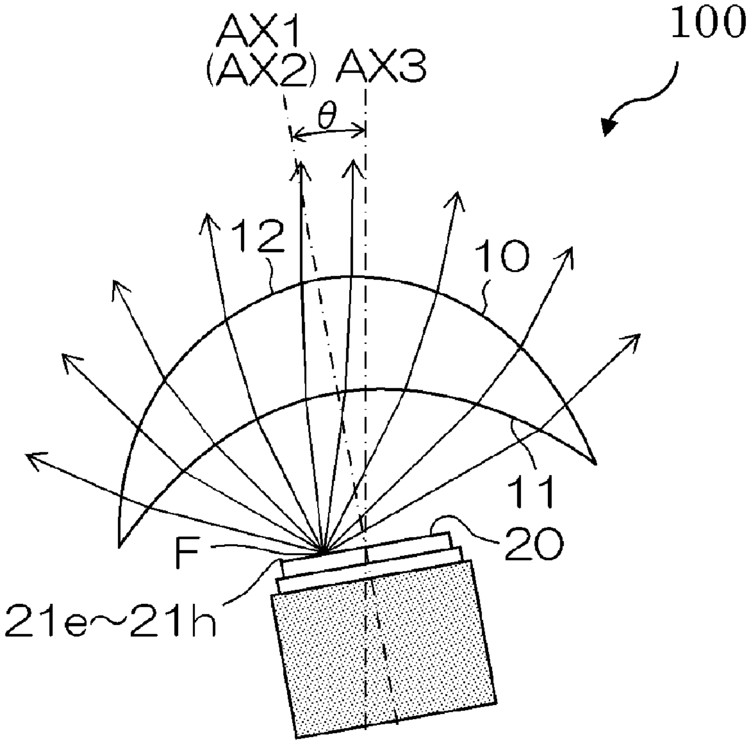
FIG. 3A is a plan view of a vehicle light made in accordance with principles of the presently disclosed subject matter to be disposed on a left front portion of a vehicle body, wherein optical paths during the AFS being turned off are illustrated.
Figure 3B:
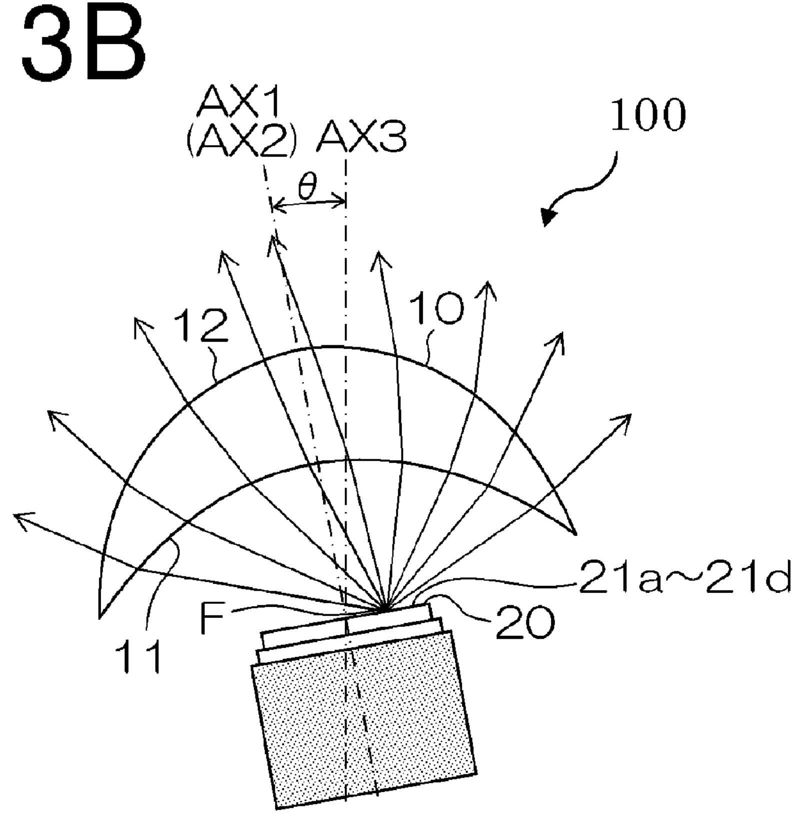
FIG. 3B is a plan view of the vehicle light of FIG. 3A wherein optical paths during the AFS being turned on are illustrated.

A vehicle light 100 of the present exemplary embodiment can be disposed on both the right and left front sides of a vehicle body of an automobile or the like. As shown in FIG. 3A, the vehicle light 100 can include a projection lens 10, a rectangular surface light source 20, and the like.

A description will now be given of the vehicle light 100 to be disposed on the left front side of a vehicle body. A vehicle light to be disposed on the right front side is symmetrical to the left side vehicle light 100 of FIG. 3A, and a description thereof will be omitted here.

Figure 4A:
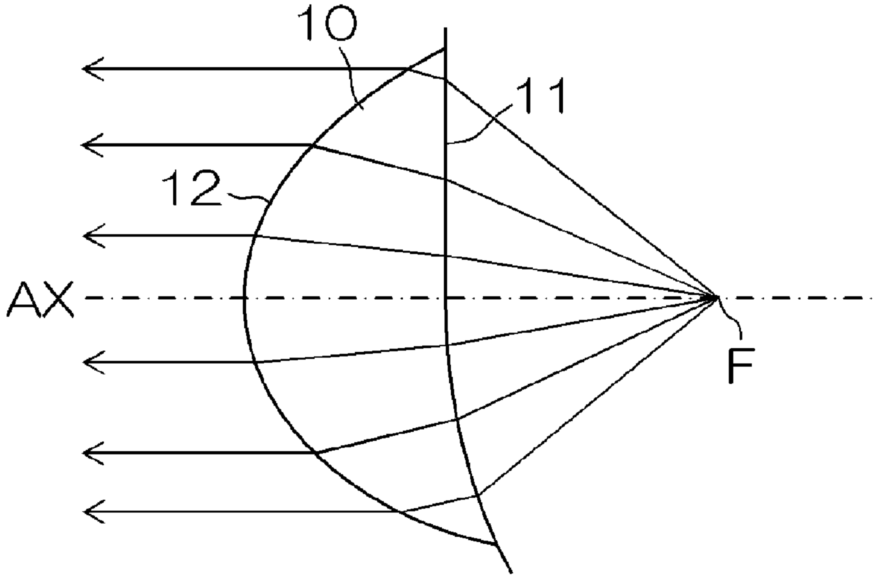
FIG. 4A is a vertical cross sectional view of a projection lens.
Figure 4B:
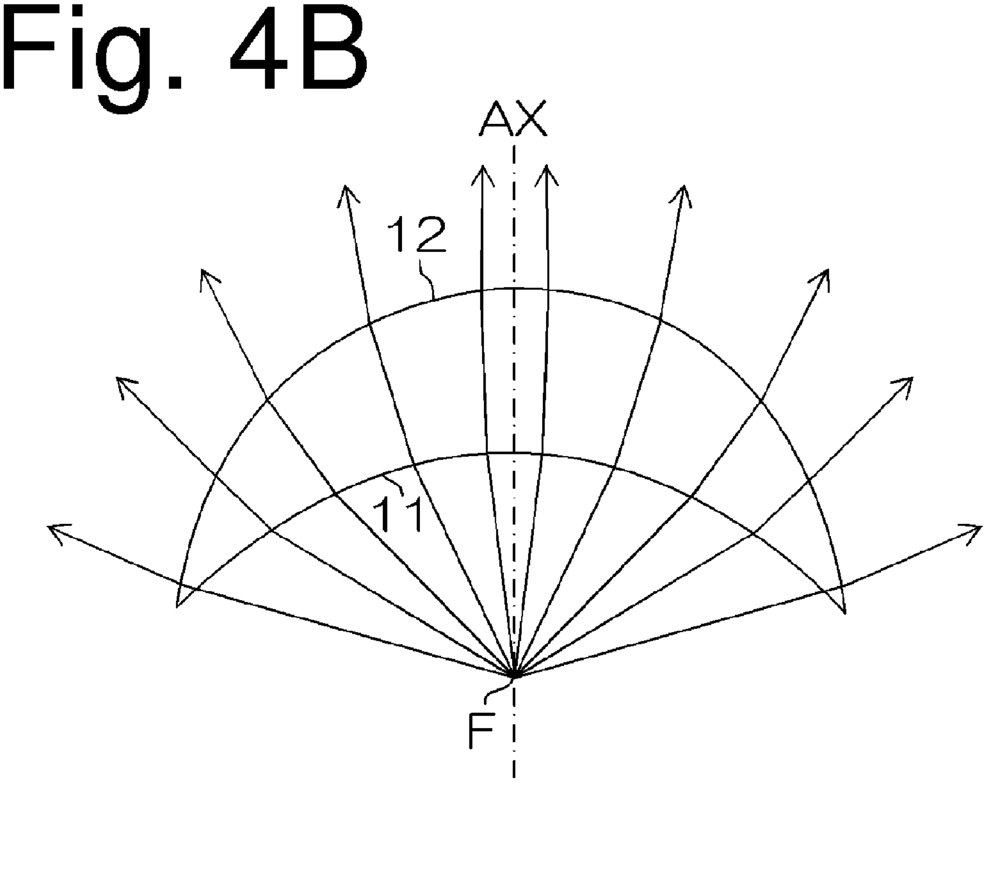
FIG. 4B is a horizontal cross sectional view of the same.

The projection lens 10 can include a light incident surface 11 on which light beams emitted from the rectangular surface light source 20 can be incident, and a light exiting surface 12 configured to allow the light beams entering the inside of the lens to exit therethrough. With reference to FIGS. 4A and 4B, the projection lens 10 can be an aspherical lens. The projection lens 10 can be configured such that the light beams emitted from rectangular surface light source 20 and entering the lens can be converged vertically (in the vertical plane) to become parallel light beams in the vertical direction as shown in FIG. 4A while they can be diffused horizontally (in the horizontal plane) as shown in FIG. 4B. The degree of diffusion in the horizontal direction can be larger as the light beams exit farther from the lens center. As shown in FIG. 3A, the projection lens 10 can be disposed such that the optical axis AX1 of the lens 10 is inclined with respect to an axis AX3 extending in the front-to-rear direction of a vehicle body, outward by an angle θ (leftward in FIG. 3A).

The projection lens 10 can be designed according to the following procedures.

Figure 5:
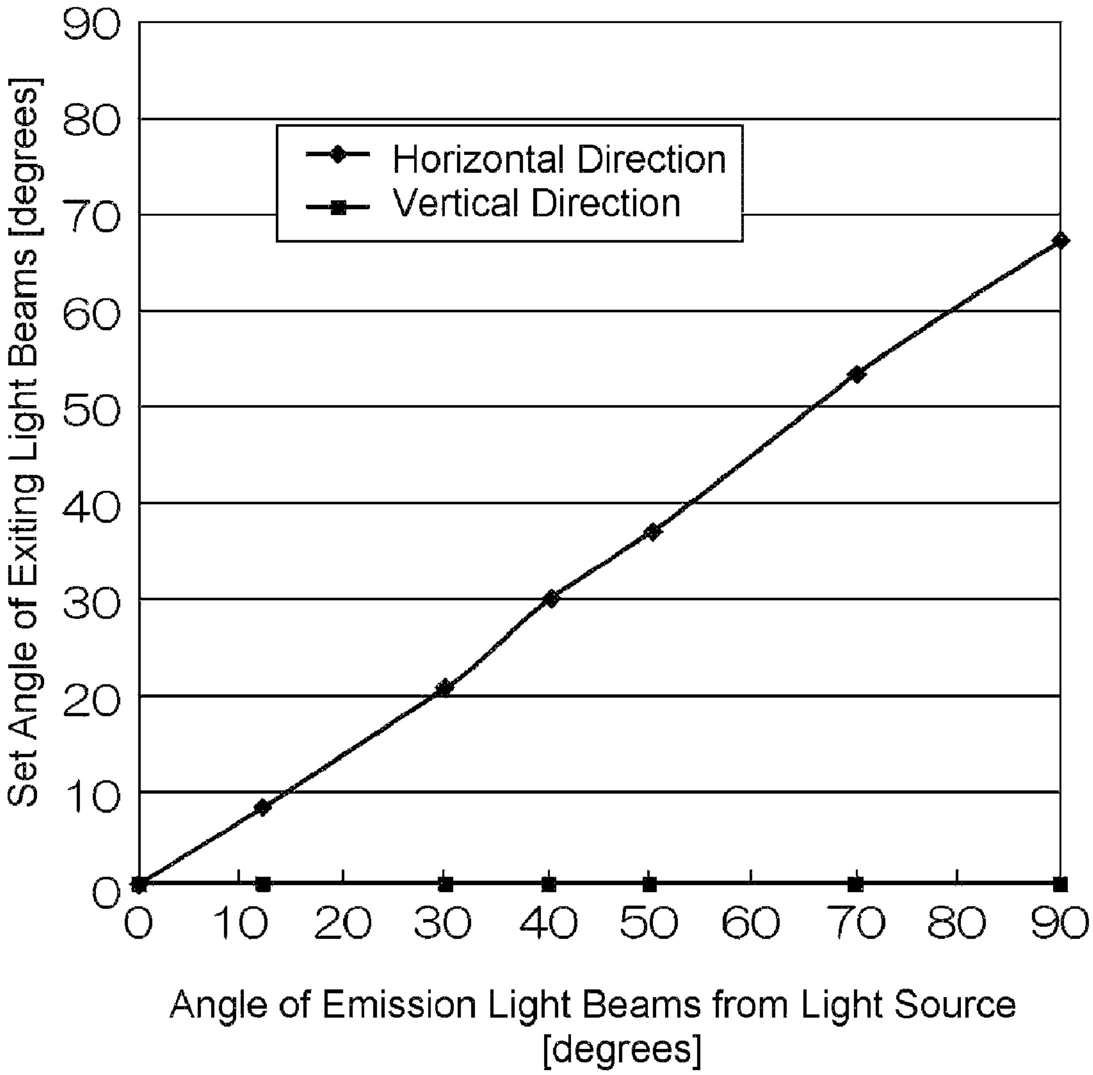
FIG. 5 is a graph showing an example of the relationship between the incident direction of light beams on the projection lens and the exiting direction of the light beams.

First, the position of a focus F and the shape of the light incident surface 11 closer to the rectangular surface light source 20 are determined. The shape of the light incident surface 11 can be formed of a concave surface in order to enhance the light incident efficiency as shown in FIGS. 4A and 4B. The light exiting surface 12 can be formed such that the light beams passing through the focus F and entering the lens 10 through the light incident surface 11 can be converged and projected in parallel with the optical axis AX1 in the vertical plane, see FIGS. 4A and 5, while the light beams can be diffused horizontally as shown in FIG. 4B wherein the degree of diffusion in the horizontal direction can be larger as the light beams exit farther from the lens center.

In this manner, the projection lens 10 can be formed to provide an optimal light distribution pattern P1 according to the size and luminous intensity distribution of the employed rectangular surface light source 20. Furthermore, since the vehicle light 100 can be composed mainly of the projection lens 10 and the rectangular surface light source 20, the depth dimension of the light can be remarkably reduced when compared with a conventional vehicle light.

The projection lens 10 can be formed by, for example, injection molding a resin material such as an acrylic resin, a polycarbonate resin, or the like transparent material being transparent in the visible range.

Figure 6A:
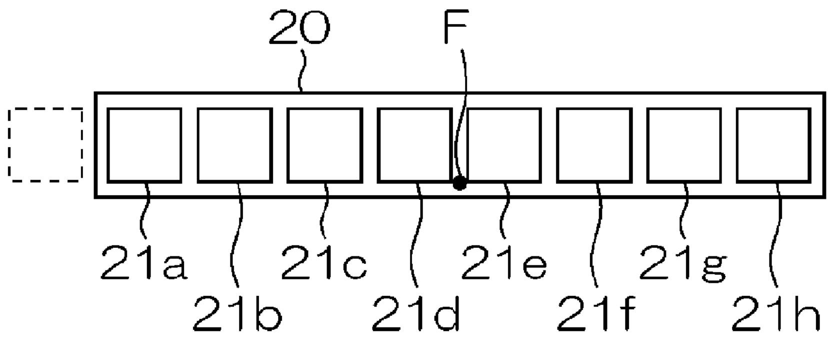
FIG. 6A is a front view of a rectangular surface light source.
Figure 6B:
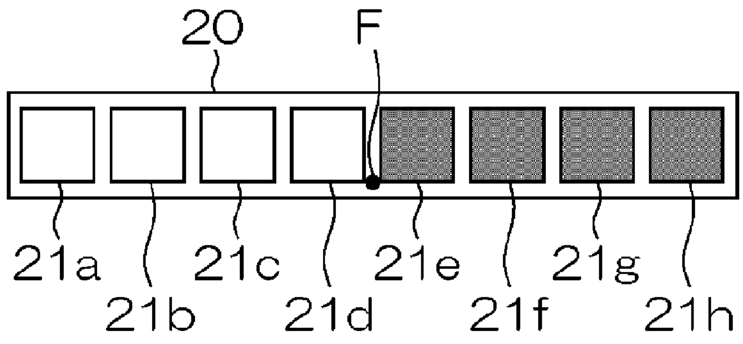
FIG. 6B is a lighting pattern during the AFS being turned off.
Figure 6C:
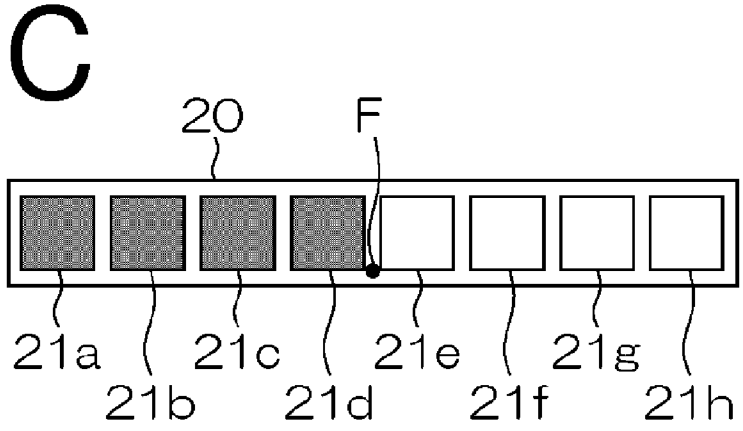

As shown in FIG. 3A, 3B, 6A, 6B, and 6C, a plurality of semiconductor light emitting devices **21*a* to 21*d* and 21*e* to 21*h* can be disposed on both sides with respect to the focus F of the projection lens 10 in line in the horizontal direction, thereby constituting the horizontally long rectangular surface light source 20 as a whole. The plurality of semiconductor light emitting devices 21*a* to 21*h* can be independently controlled to be turned on/off. The number of the semiconductor light emitting devices in FIGS. 6A to 6C is eight (8**), but is not limited to a particular number and can be varied (increased/decreased) according to the desired light intensity.

The rectangular surface light source 20 can be disposed such that the longer side thereof is directed horizontally and the optical axis AX2 thereof is inclined with respect to the axis AX3 extending in the front-to-rear direction of a vehicle body, outward by an angle θ (leftward in FIG. 3A). Furthermore, the light source 20 can be disposed such that the center lower edge thereof is matched to (or located at) the focus F of the projection lens 10 as shown in FIGS. 6A to 6C.

The semiconductor light emitting device **21*a* to 21*h* for use in this rectangular surface light source 20** may be a pseudo white LED light source including a light source package with a plurality of light emission chips (for example, blue LED chips) mounted thereon, and a wavelength conversion layer formed thereover by coating, fixing, or the like. The wavelength conversion layer can include a phosphor material excited by the emission wavelength of the light emission chips in order to emit light (Lambertian emission) (for example, emitting yellow light).

The semiconductor light emitting devices **21*a* to 21*d* can be controlled to be turned on when the AFS (Adaptive Front-Lighting System) is turned on according to a particular steering angle range, as shown in FIG. 6B. On the other hand, the semiconductor light emitting devices 21*e* to 21*h* can be controlled to be turned on when the AFS is turned off according to another particular steering angle range, as shown in FIG. 6**C.

Figure 7:
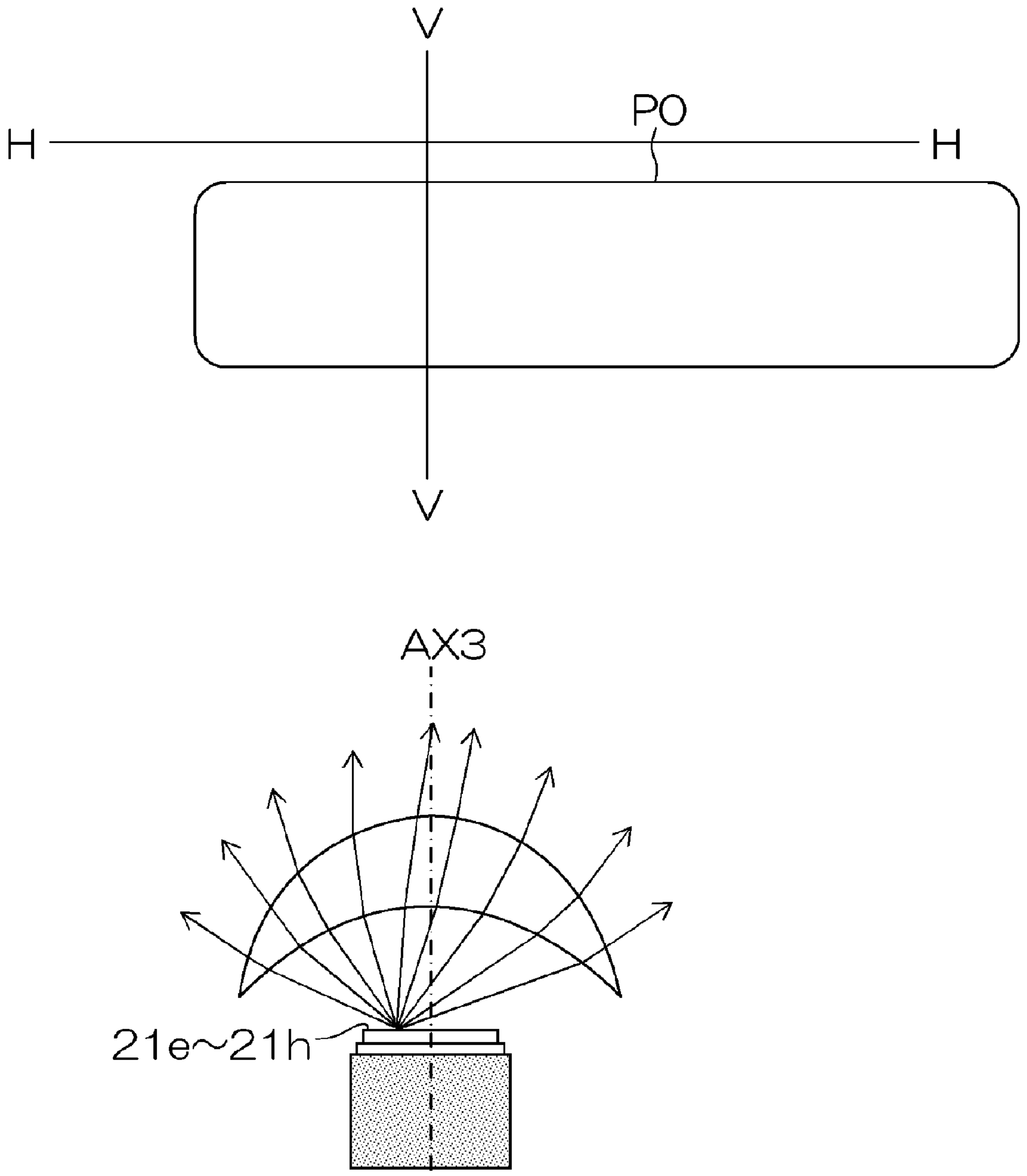
FIG. 7 is a schematic diagram illustrating the case where a projection lens and a rectangular surface light source which are not inclined by an angle θ form a light distribution pattern P0.

If the projection lens 10 and the rectangular surface light source 20 are not inclined by the angle θ, when the four semiconductor light emitting devices **21*e* to 21*h* are turned on during the AFS being off (see FIG. 6B), as shown in FIG. 7, a light distribution pattern P0 may be formed such that the pattern P0 is shifted rightward with respect to the vertical axis V-V in front of the vehicle body. This is because the four semiconductor light emitting devices 21*e* to 21*h* are disposed on the outer side with respect to the focus F of the projection lens 10 (left side in FIG. 7**).

Figure 8:
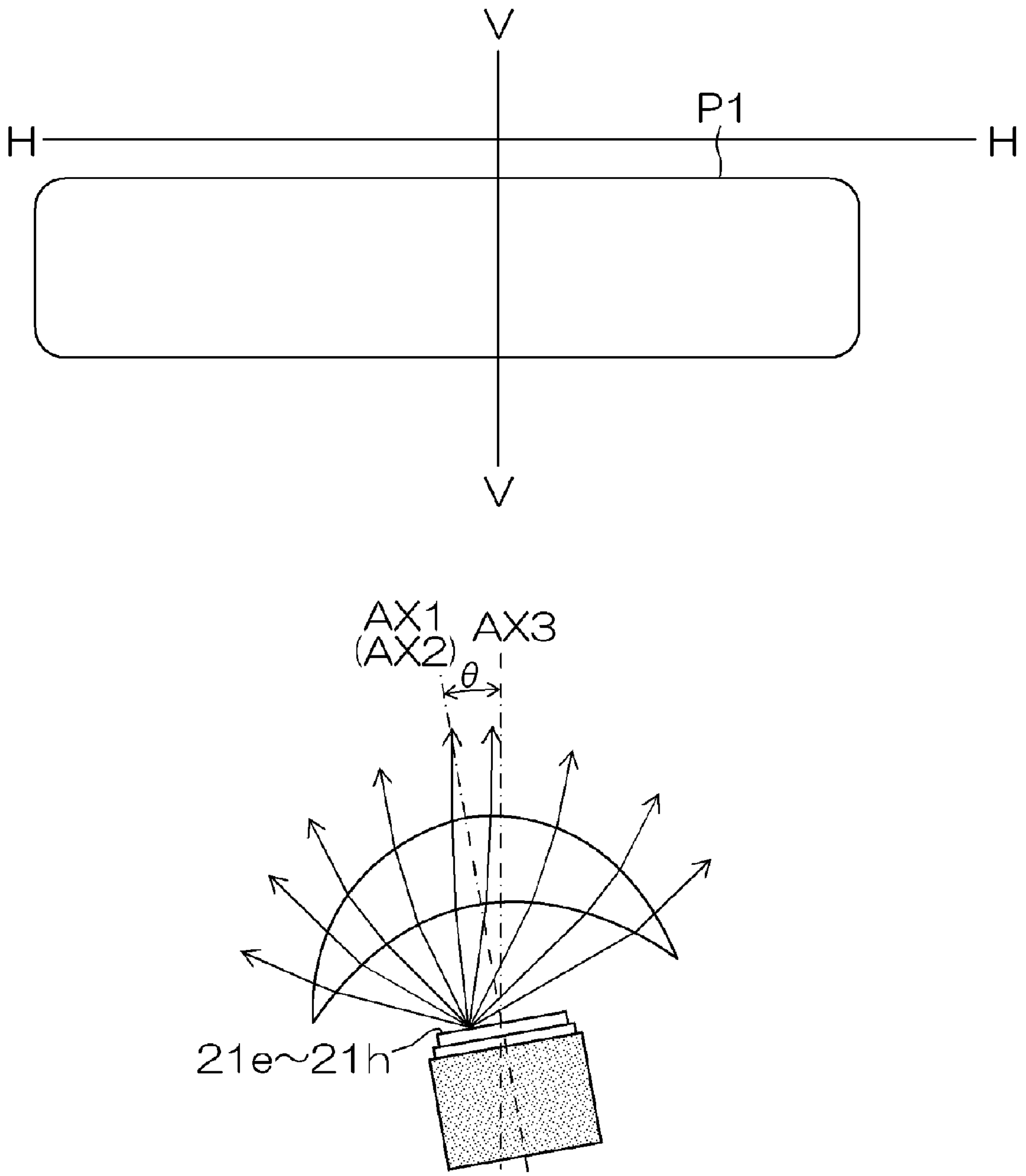
FIG. 8 is a schematic diagram illustrating the case where a projection lens and a rectangular surface light source which are inclined by the angle θ form a light distribution pattern P1 where the AFS is turned off.

In order to correct the shift of the light distribution pattern, the present exemplary embodiment can be configured such that the respective optical axes AX1 and AX2 of the projection lens 10 and the rectangular surface light source 20 are inclined by an angle θ toward the outer side (left side in FIG. 3A) with respect to the axis AX3 extending in the front-to-rear direction of a vehicle body. When the four semiconductor light emitting devices **21*e* to 21*h* disposed on the outer side, with respect to the focus F of the projection lens 10 are turned on during the AFS being turned off as shown in FIG. 6B, the light beams that have passed the projection lens 10 can form a light distribution pattern P1 that is horizontally uniform and wide with respect to the vertical axis V-V in front of the vehicle body and has a clear cut-off line as shown in FIGS. 8 and 10**A.

Figure 9:
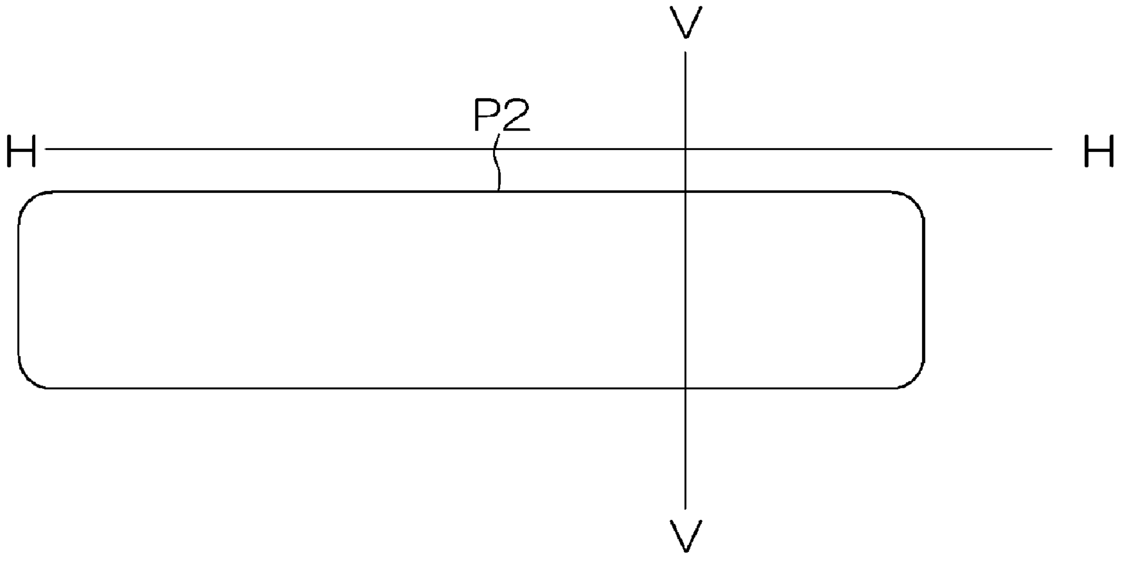
Figure 9:
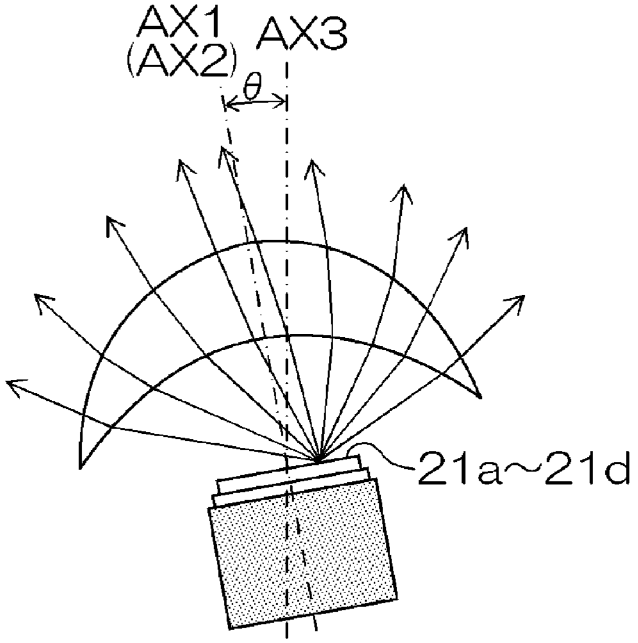

In the present exemplary embodiment configured as described above, when the four semiconductor light emitting devices **21*a* to 21*d* disposed on the inner side (right side in FIG. 3B), with respect to the focus F of the projection lens 10 are turned on during the AFS being turned on as shown in FIG. 6C, the light beams that have passed the projection lens 10 can form a light distribution pattern P2 that is suitable for the AFS, is shifted leftward more than the light distribution pattern P1, and has a clear cut-off line as shown in FIGS. 9 and 10**B.

The angle θ can be set appropriately in accordance with the required light distribution pattern suitable for the AFS and the like (or in accordance with the regulated specification based on a certain domestic law or the like regulations). Specifically, the angle θ may be about 1 to 20 degrees, and in the present exemplary embodiment, set to about 10 degrees.

Figure 11A:
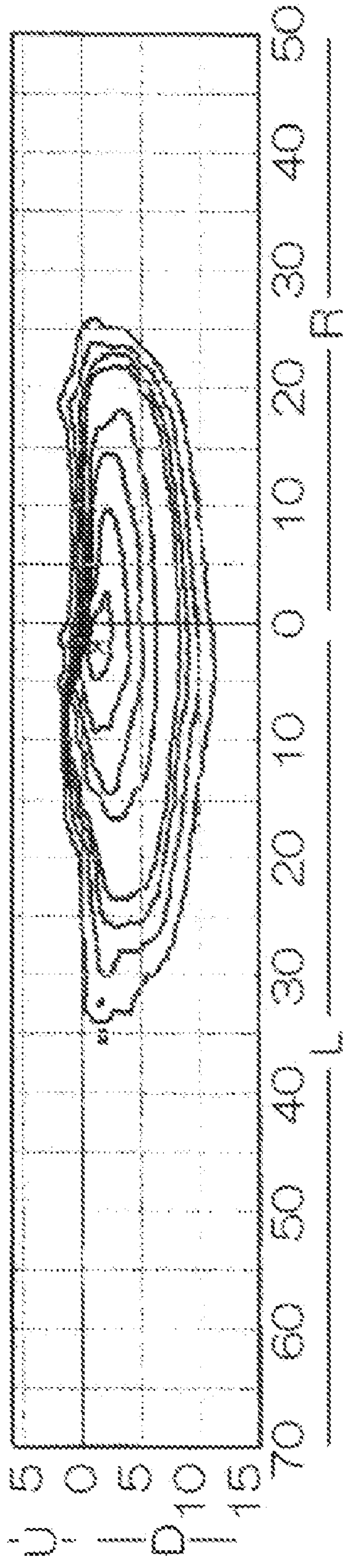
FIG. 11A is a diagram illustrating a light distribution pattern formed in the case of a comparative vehicle light (Comparative Example 1) where an AFS is turned off.
Figure 11B:
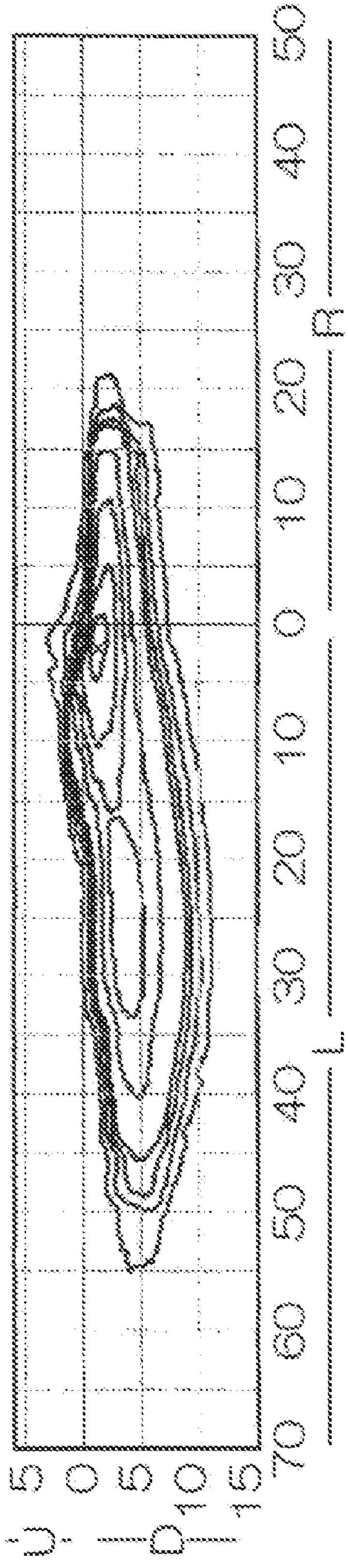

The present inventor has confirmed that the vehicle light 100 configured as described above can provide the same AFS performance as the existing AFS performance that is shown in FIGS. 11A to 12B. Specifically, FIG. 11A is a diagram showing a light distribution pattern when an existing AFS as a first comparative example is turned off while FIG. 11B is a diagram showing another light distribution pattern when the existing AFS is turned on.

Figure 10A:
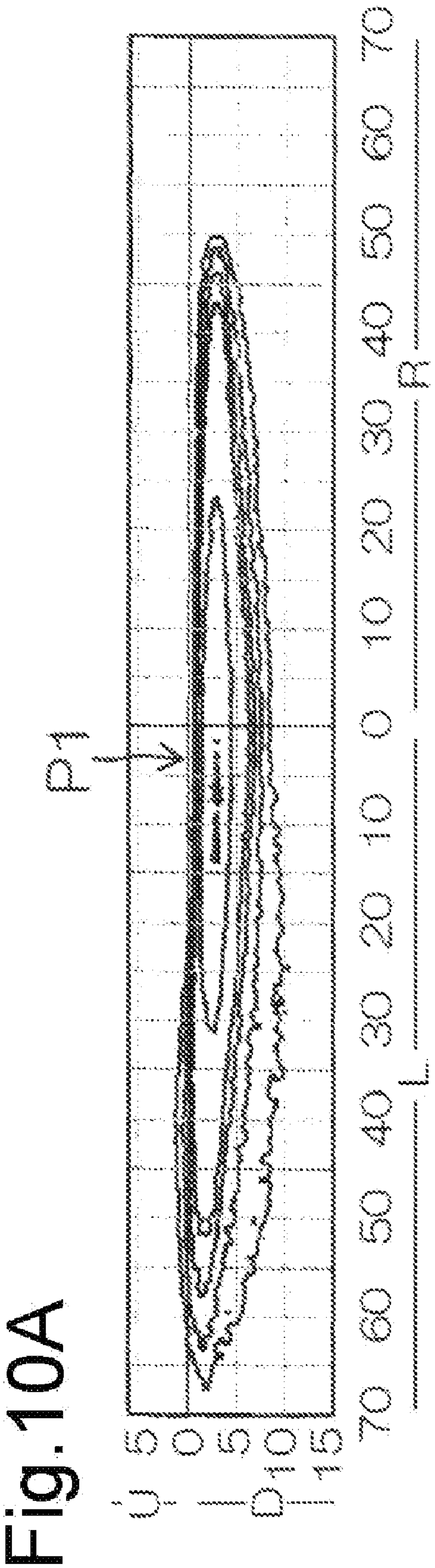
FIG. 10A is a diagram illustrating the light distribution pattern P1 formed in the case where the projection lens and the rectangular surface light source are inclined by the angle θ and the AFS is turned off.
Figure 10B:
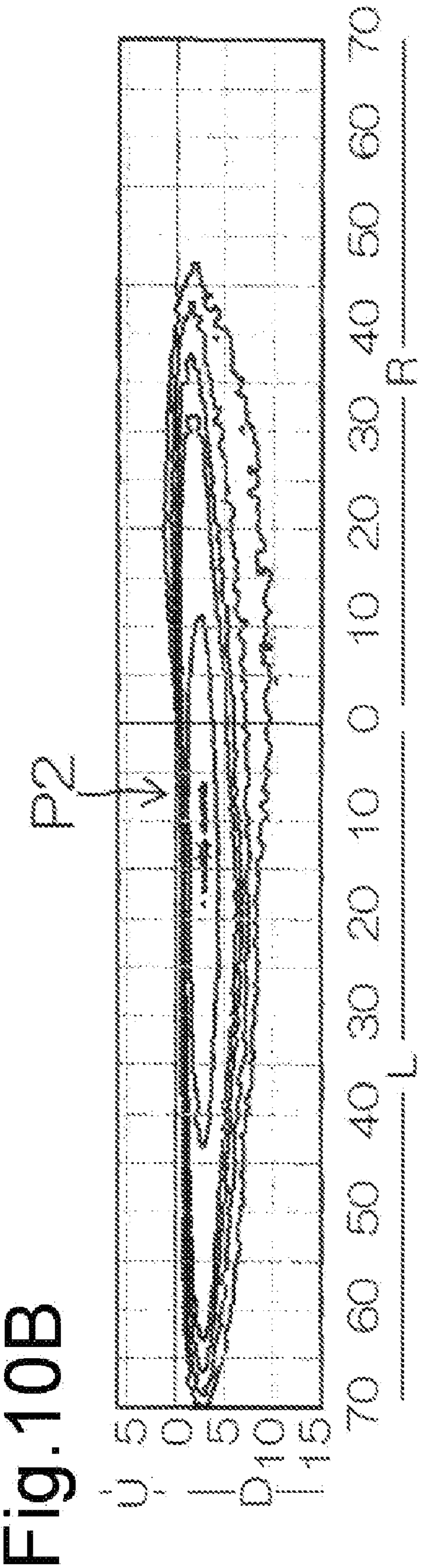
Figure 12A:
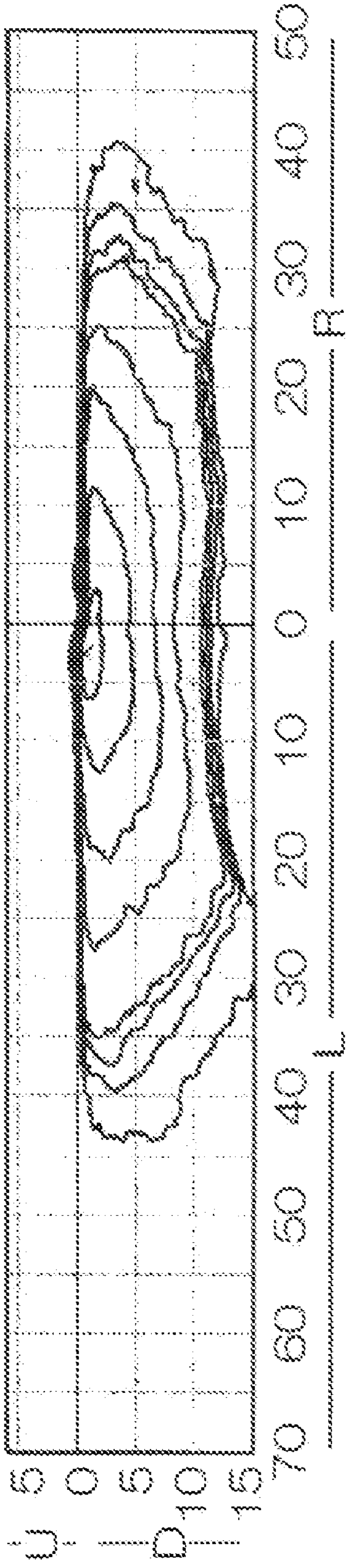
FIG. 12A is a diagram illustrating a light distribution pattern formed in the case of another comparative vehicle light (Comparative Example 2) where an AFS is turned off.
Figure 12B:
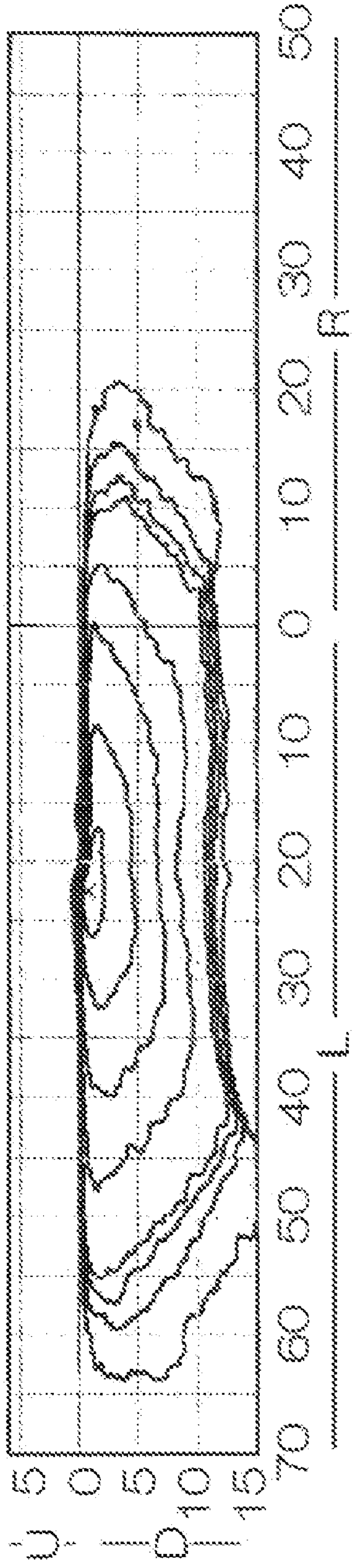

Also, FIG. 12A is a diagram showing another light distribution pattern when another existing AFS as a second comparative example is turned off while FIG. 12B is a diagram showing another light distribution pattern when the existing AFS is turned on. When compared with these comparative examples, the vehicle light 100 configured as described above can form the light distribution pattern P2 during the AFS being turned on (FIG. 6C), wherein the light distribution pattern P2 can be formed by turning on the four semiconductor light emitting devices **21*a* to 21*d* (FIG. 6C) and has almost the same luminous intensity distribution as that when the AFS is turned off (the four semiconductor light emitting devices 21*e* to 21*h* are turned on as shown in FIG. 6B) by shifting the light distribution pattern P1 leftward (see FIGS. 10A and 10B). For example, the light intensity at about 30° leftward in the light distribution pattern P1 during the AFS being turned off (FIG. 10A) almost corresponds to that at about 45° leftward in the light distribution pattern P2 during the AFS being turned on (FIG. 10**B).

As described above, the vehicle light 100 of the present exemplary embodiment can be configured such that the respective optical axes AX1 and AX2 of the projection lens 10 and the rectangular surface light source 20 are inclined by an angle θ toward the outer side (left side in FIG. 3A) with respect to the axis AX3 extending in the front-to-rear direction of a vehicle body. In this configuration, when the four semiconductor light emitting devices 21*e* to 21*h* disposed on the outer side, with respect to the focus F of the projection lens 10 are turned on during the AFS being turned off as shown in FIG. 6B, the light beams can form the light distribution pattern P1 that is horizontally uniform and wide with respect to the vertical axis V-V in front of the vehicle body and has a clear cut-off line as shown in FIGS. 8 and 10A. Furthermore, when the four semiconductor light emitting devices 21*a* to 21*d* disposed on the inner side (right side in FIG. 3B), with respect to the focus F of the projection lens 10 are turned on during the AFS being turned on as shown in FIG. 6C, the light beams can form the light distribution pattern P2 that is suitable for the AFS, is shifted leftward more than the light distribution pattern P1, and has a clear cut-off line as shown in FIGS. 9 and 10B. Namely, the vehicle light 100 of the present exemplary embodiment can electrically change over between the horizontally wide light distribution pattern P1 and the AFS light distribution pattern P2 for projecting light beams leftward (or rightward according to the traffic system).

A description will now be given of another exemplary embodiment.

Figure 13:
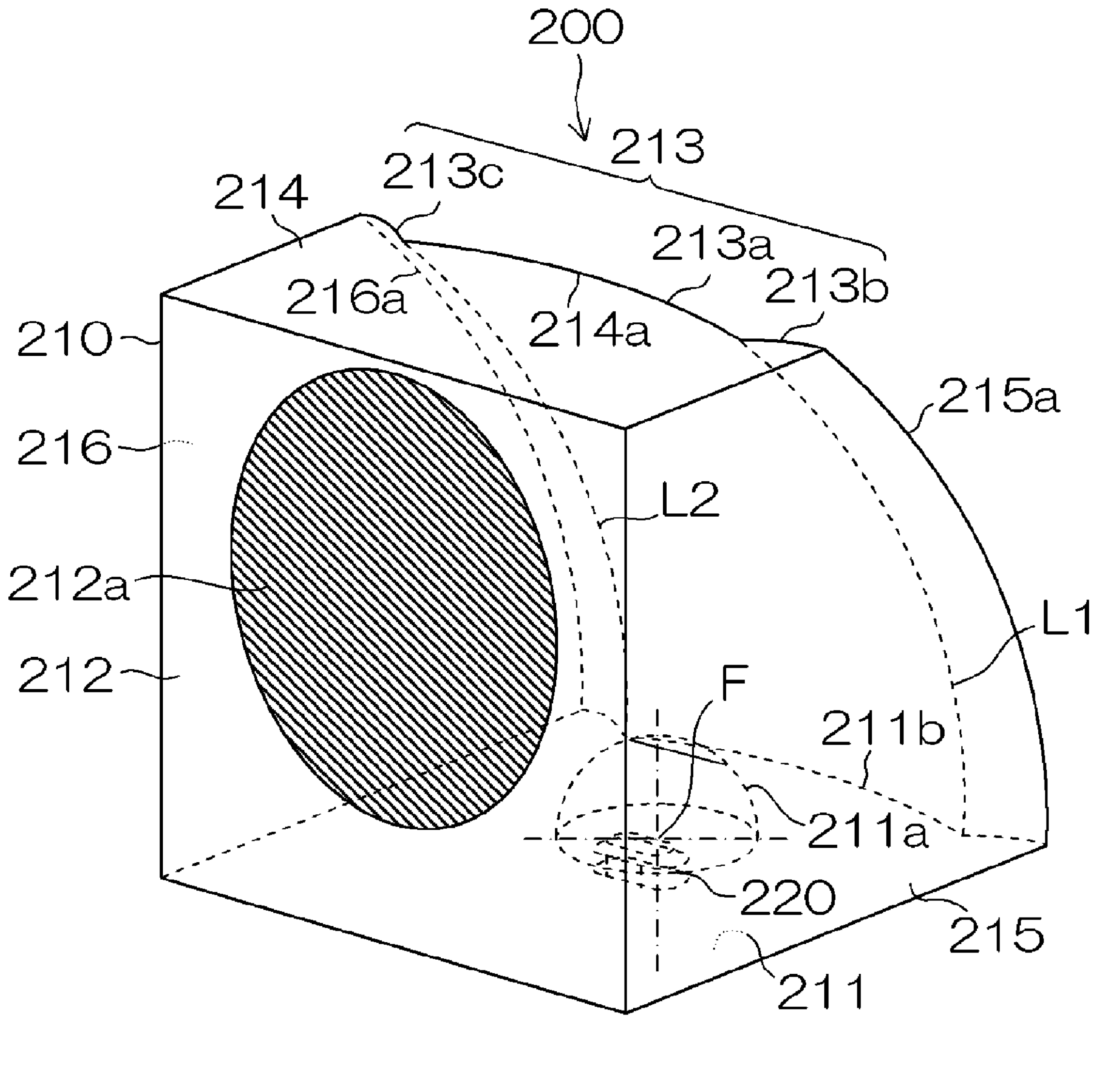
FIG. 13 is a perspective view of another example of a projection lens utilizing a light-guiding lens with a particular design.

In the above exemplary embodiment, the projection lens 10 can be an aspherical lens including the light incident surface 11 and the light exiting surface 12, but the presently disclosed subject matter is not limited to this. For example, the projection lens 10 can be a lens body 210 as shown in FIG. 13. The solid lens body 221 can have a front surface 212 directed forward and including a light exiting surface 212*a*, a rear surface 213 directed rearward and including a reflecting surface 213*a* and connecting surfaces 213*b* and 213*c*, a bottom surface 211 including a light incident surface 211*a*, a top surface 214, and side surfaces 215 and 216. The projection lens 10 (210) can be formed by, for example, injection molding a resin material such as an acrylic resin, a polycarbonate resin, or the like transparent material being transparent in the visible range.

The light incident surface 211*a* can be formed as a lens surface for receiving light beams emitted from a rectangular surface light source 220, in the bottom surface 211. In FIG. 13, the light incident surface 211*a* is illustrated as a semi-spherical shape concave toward the inside of the lens body 210.

The reflecting surface 213*a* can be a revolved parabolic reflecting surface, for example, for reflecting the incident light beams from the rectangular surface light source 220 to a predetermined direction. The reflecting surface 213*a* can be formed by subjecting an area to metal deposition process such as aluminum deposition, wherein the area is defined by limiting the rear surface 213 with a rear side edge 211*b* of the bottom surface 211, a rear side edge 214*a* of the top surface 214, and two connection lines L1 and L2 formed therebetween.

The connecting surface 213*b* can be used to define the shape of the solid lens body 210 but not involved to form the required light distribution pattern. The connecting surface 213*b* can be defined by the rear surface 213 except for the reflecting surface 213*a* on the left side (between the line L1 and a rear side edge 215*a* of the side surface 215). The connecting surface 213*c* can also be used to define the shape of the solid lens body 210 but not involved to form the required light distribution pattern. The connecting surface 213*c* can be defined by the rear surface 213 except for the reflecting surface 213*a* on the right side (between the line L2 and a rear side edge 216*a* of the side surface 216).

The light exiting surface 212*a* can be a lens surface for allowing the light beams reflected from the reflecting surface 213*a* to exit therethrough, and formed in the front surface 212.

The employed rectangular surface light source 220 can be the same light source 20 as in the previous exemplary embodiment, and the description thereof will be omitted here.

It should be noted that the present exemplary embodiment can utilize the solid lens body 210 which has a bent optical path system. Accordingly, the previously defined "front-to-rear direction" can be considered as being bent by the reflecting surface.

the vehicle light 200 configured as described above can provide the same AFS performance as the existing AFS performance that is shown in FIGS. 11A to 12B. Specifically, when compared with these comparative examples, the vehicle light 200 configured as described above can form a light distribution pattern P4 during the AFS being turned on (FIG. 6C), wherein the light distribution pattern P4 can be formed by turning on the four semiconductor light emitting devices 21*a* to 21*d* (FIG. 6C) and has almost the same luminous intensity distribution as that when the AFS is turned off (the four semiconductor light emitting devices 21*e* to 21*h* are turned on as shown in FIG. 6B) by shifting a light distribution pattern P3 leftward (see FIGS. 14A and 14B). For example, the light intensity at about 35° leftward in the light distribution pattern P3 during the AFS being turned off (FIG. 14A) almost corresponds to that at about 50° leftward in the light distribution pattern P4 during the AFS being turned on (FIG. 14B). It should be noted that the shift amount of the light distribution pattern can be controlled by the design of the projection lens and the like according to a required vehicle light specification, and the shift amount in the present exemplary embodiment (shown in FIGS. 14A and 14B) is larger than that in the previous exemplary embodiment (shown in FIGS. 10A and 10B).

Figure 14A:
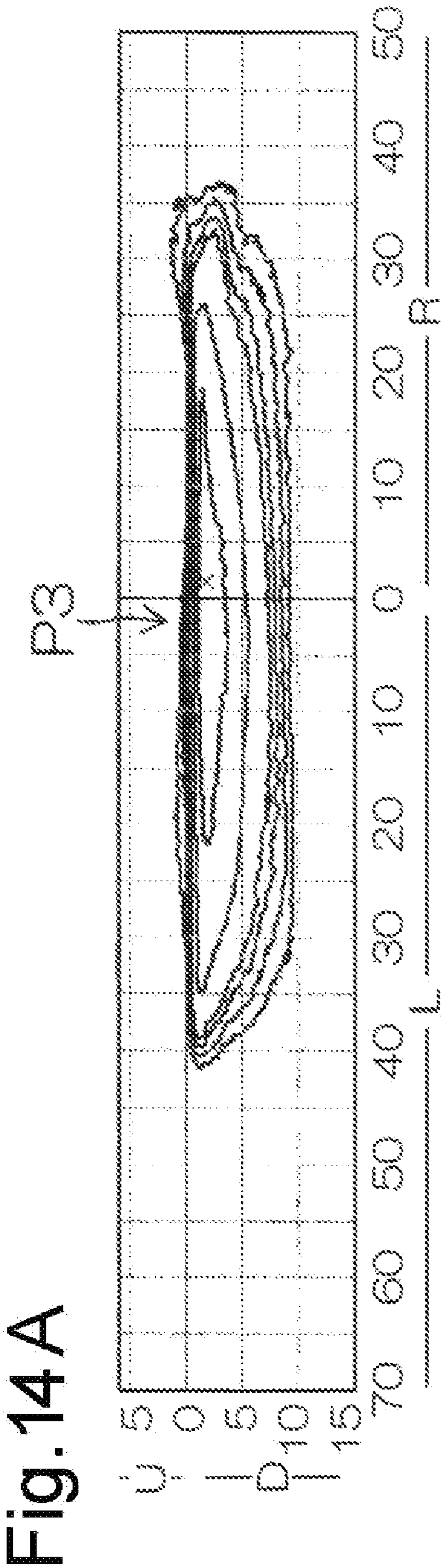
FIG. 14A is a diagram illustrating a light distribution pattern P3 formed in the case where the light-guiding lens as a projection lens and the rectangular surface light source are inclined by the angle θ and the AFS is turned off.
Figure 14B:
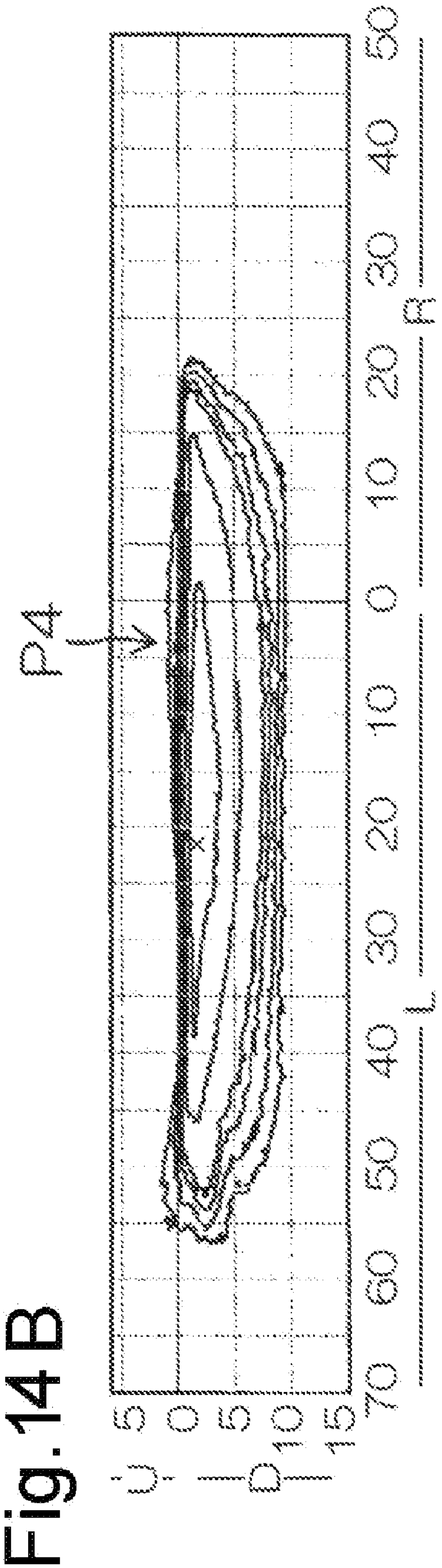

As described above, the vehicle light 200 of the present exemplary embodiment can be configured such that, when the four semiconductor light emitting devices 21*e* to 21*h* disposed on the outer side, with respect to the focus F of the lens body 210 are turned on during the AFS being turned off as shown in FIG. 6B, the light beams can form the light distribution pattern P3 that is horizontally uniform and wide with respect to the vertical axis V-V in front of the vehicle body and has a clear cut-off line as shown in FIG. 14A. Furthermore, when the four semiconductor light emitting devices 21*a* to 21*d* disposed on the inner side with respect to the focus F of the lens body 210 are turned on during the AFS being turned on as shown in FIG. 6C, the light beams can form the light distribution pattern P4 that is suitable for the AFS, is shifted leftward more than the light distribution pattern P4, and has a clear cut-off line as shown in FIG. 14B. Namely, the vehicle light 200 of the present exemplary embodiment can electrically change over between the horizontally wide light distribution pattern P3 and the AFS light distribution pattern P4 for projecting light beams leftward (or rightward according to the traffic system).

Figure 15A:
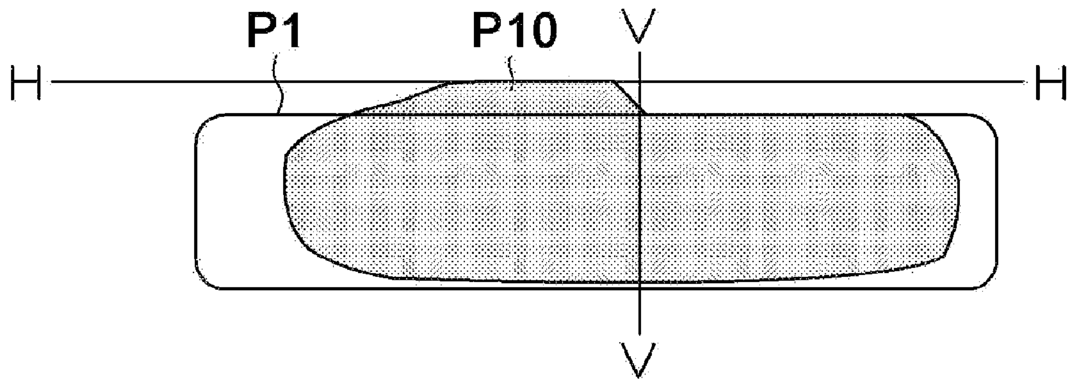
FIG. 15A is a diagram illustrating an exemplary synthesized light distribution pattern when the AFS is turned off, wherein the horizontally wide light distribution pattern P1 and another light distribution pattern P10 formed by another optical unit are synthesized.
Figure 15B:
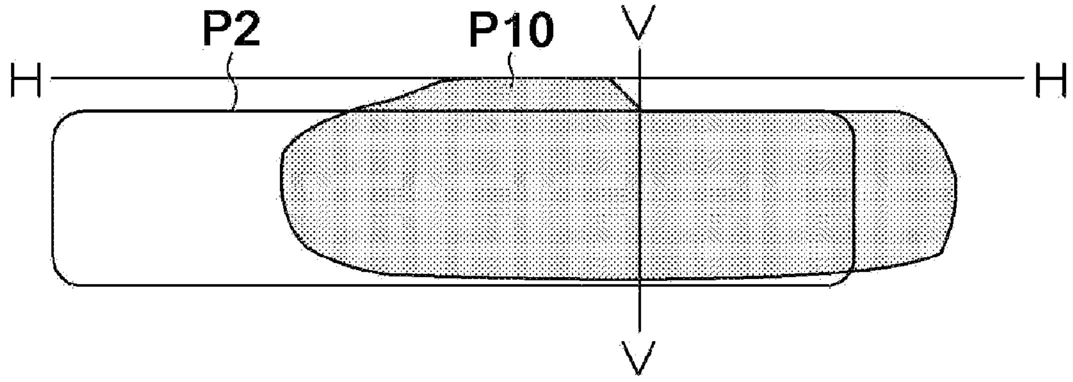
FIG. 15B is a diagram illustrating an exemplary synthesized light distribution pattern when the AFS is turned on, wherein the light distribution pattern P2 suitable for the AFS formed on the left side and another light distribution pattern P10 formed by another optical unit are synthesized.

In the illustrated exemplary embodiments as above, the vehicle light 100 or 200 is used singly, but the presently disclosed subject matter is not limited thereto. For example, the vehicle light 100 (200) can be combined with another optical unit to form a synthesized light distribution pattern, for example, including the horizontally wide light distribution pattern P1 (P3) and another light distribution pattern P10 in combination during the AFS being turned off as shown in FIG. 15A. Furthermore, during the AFS being turned on, the AFS light distribution pattern P2 (P4) can be combined with the light distribution pattern P10 as shown in FIG. 15B to form another synthesized light distribution pattern suitable for the AFS.

In the above exemplary embodiments, the semiconductor light emitting devices are disposed with respect to the focus F of the lens 10 (210) on the outer side and the inner side symmetrically (see FIG. 6A), however, the presently disclosed subject matter is not limited thereto. The number of the semiconductor light emitting devices on the inner side (right side in FIG. 3A) can be greater than that of the devices on the outer side (for example, dotted rectangular in FIG. 6A) so as to extend the illumination area on the left side (or right side according to the traffic system).

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light, comprising:

a projection lens having a light incident surface and a light exiting surface, a focus, and an optical axis; and a horizontally long rectangular surface light source having an optical axis and including a plurality of semiconductor light emitting devices that are horizontally disposed on both sides with respect to the focus of the projection lens and are configured to be independently controlled to be turned on/off, wherein the projection lens is configured to vertically converge and horizontally diffuse light beams that are incident on the light incident surface and exit through the light exiting surface, the projection lens and the rectangular surface light source are disposed so that the respective optical axes thereof are inclined by an angle θ toward a first side with respect to an axis extending in a front-to-rear direction of a vehicle body where the vehicle light is to be mounted, thereby forming a light distribution pattern horizontally uniform with respect to a vertical axis in front of the vehicle body by light beams emitted from the semiconductor light emitting devices disposed on the first side with respect to the focus of the projection lens and passing through the projection lens.

2. The vehicle light according to claim 1, wherein the first side is an outer side with respect to the vehicle as compared to the focus of the projection lens when the vehicle light is installed in the vehicle body.

3. The vehicle light according to claim 1, wherein the projection lens has a reflecting surface configured to reflect light beams entering through the light incident surface so that the light beams are allowed to exit through the light exiting surface after being reflected by the reflecting surface, and wherein the axis extending in the front to rear direction is bent due to the orientation of the reflecting surface with respect to the light incident surface.

4. The vehicle light according to claim 2, wherein the projection lens has a reflecting surface configured to reflect light beams entering through the light incident surface so that the light beams are allowed to exit through the light exiting surface after being reflected by the reflecting surface, and wherein the axis extending in the front to rear direction is bent due to the orientation of the reflecting surface with respect to the light incident surface.

5. The vehicle light according to claim 1, wherein the plurality of semiconductor light emitting devices are located such that a lowermost edge of each of the plurality of semiconductor light emitting devices is located along a straight line intersecting the focus of the projection lens.

6. The vehicle light according to claim 5, wherein the focus of the projection lens is located along a vertical central axis of the light source.

7. The vehicle light according to claim 1, wherein the focus of the projection lens is located along a vertical central axis of the light source.

8. The vehicle light according to claim 1, wherein the plurality of semiconductor light emitting devices are located such that half of the plurality of semiconductor light emitting devices are located on an inner side with respect to the focus of the projection lens, and a remaining half of the plurality of semiconductor light emitting devices are located on an outer side with respect to the focus of the projection lens.

9. The vehicle light according to claim 1, wherein the projection lens is configured such that a degree of diffusion in the horizontal direction is larger as light beams exit farther from a center of the projection lens.

10. The vehicle light according to claim 1, wherein the projection lens has a reflecting surface configured to reflect light beams entering through the light incident surface so that the light beams are allowed to exit through the light exiting surface after being reflected by the reflecting surface, and wherein the axis extending in the front to rear direction is considered to be an entire vertical plane containing the axis extending in the front to rear direction in order to determine the angle of the optical axes relative to the axis extending in the front to rear direction.

11. The vehicle light according to claim 2, wherein the projection lens has a reflecting surface configured to reflect light beams entering through the light incident surface so that the light beams are allowed to exit through the light exiting surface after being reflected by the reflecting surface, and wherein the axis extending in the front to rear direction is considered to be an entire vertical plane containing the axis extending in the front to rear direction in order to determine the angle of the optical axes relative to the axis extending in the front to rear direction.

12. A vehicle light configured to be attached to a vehicle which has a longitudinal axis extending parallel with a front-to-rear direction of the vehicle, the vehicle light comprising:

a projection lens having a light incident surface and a light exiting surface, a focus, and an optical axis; and a light source having an optical axis and including a plurality of semiconductor light emitting devices that are disposed along a substrate, the semiconductor light emitting devices configured to be independently controlled to be turned on/off, wherein the projection lens is configured to vertically converge and horizontally diffuse light beams received from the light source, the optical axis of the projection lens and the optical axis of the light source are inclined by an angle θ greater than zero with respect to an axis extending parallel with the front-to-rear direction of the vehicle, thereby forming a horizontally uniform light distribution pattern with respect to a vertical axis in front of the vehicle by light beams emitted from the semiconductor light emitting devices disposed on a first side with respect to the focus of the projection lens.

13. The vehicle light according to claim 12, wherein the first side is an outer side with respect to the vehicle as compared to the focus of the projection lens when the vehicle light is installed in the vehicle.

14. The vehicle light according to claim 12, wherein the plurality of semiconductor light emitting devices are located such that a lowermost edge of each of the plurality of semiconductor light emitting devices is located along a straight line intersecting the focus of the projection lens.

15. The vehicle light according to claim 14, wherein the focus of the projection lens is located along a vertical central axis of the light source.

16. The vehicle light according to claim 12, wherein the focus of the projection lens is located along a vertical central axis of the light source.

17. The vehicle light according to claim 12, wherein the plurality of semiconductor light emitting devices are located such that half of the plurality of semiconductor light emitting devices are located on an inner side with respect to the focus of the projection lens, and a remaining half of the plurality of semiconductor light emitting devices are located on an outer side with respect to the focus of the projection lens.

18. The vehicle light according to claim 12, wherein the projection lens is configured such that a degree of diffusion in the horizontal direction is larger as light beams exit farther from a center of the projection lens.

* * * * *